Nov. 23, 1965   R. SALCEDO GUMUCIO   3,219,486
RECHARGEABLE FUEL CELL
Filed July 21, 1961

INVENTOR:
RICARDO SALCEDO GUMUCIO
BY Irving Holtzman
ATTORNEY.

United States Patent Office 3,219,486
Patented Nov. 23, 1965

3,219,486
RECHARGEABLE FUEL CELL
Ricardo Salcedo Gumucio, Madrid, Spain, assignor to Yardney International Corp., New York, N.Y., a corporation of New York
Filed July 21, 1961, Ser. No. 125,779
4 Claims. (Cl. 136—86)

This invention relates to electric batteries of the type having a positive gas electrode and a rechargeable negative electrode.

Batteries of this type, sometimes referred to as air or oxygen cells, utilize the known abilities of certain elements, e.g. carbon or silver, to promote the diffusion of oxygen in a liquid electrolyte upon the introduction of an oxygen-containing gaseous fluid (e.g. pure oxygen or air) into a porous body which consists of one or more elements of this character and constitutes the positive electrode. When the two electrodes are interconnected by an external load circuit, current flows through that circuit and oxygen migrates through the electrolyte to the negative electrode to oxidize the base metal constituting the active material thereof. When this oxidation process has been completed, the battery is fully discharged.

Attempts have been made in the past to recharge the battery by connecting a reverse voltage across the two electrodes (with the oxygen supply cut off) whereby the active material of the negative electrode is again reduced to the metallic state. This procedure, however, gives rise to certain electrochemical reactions at the positive electrode which impair its catalytic effect, i.e. the ability of its active material to promote the diffusion of oxygen during a subsequent discharge cycle. The general object of my invention is to avoid this drawback.

In accordance with this invention I provide a separate or auxiliary electrode, consisting of an inert material (e.g. stainless steel) which is substantially nonoxidizable in the electrolyte, which does not participate in the discharge cycle but which is available as a counterelectrode in a subsequent charging cycle in which the positive electrode is inactive. In a particularly advantageous arrangement, the auxiliary electrode has a perforated structure and is spacedly interposed between the negative and positive electrodes.

Figure 1:
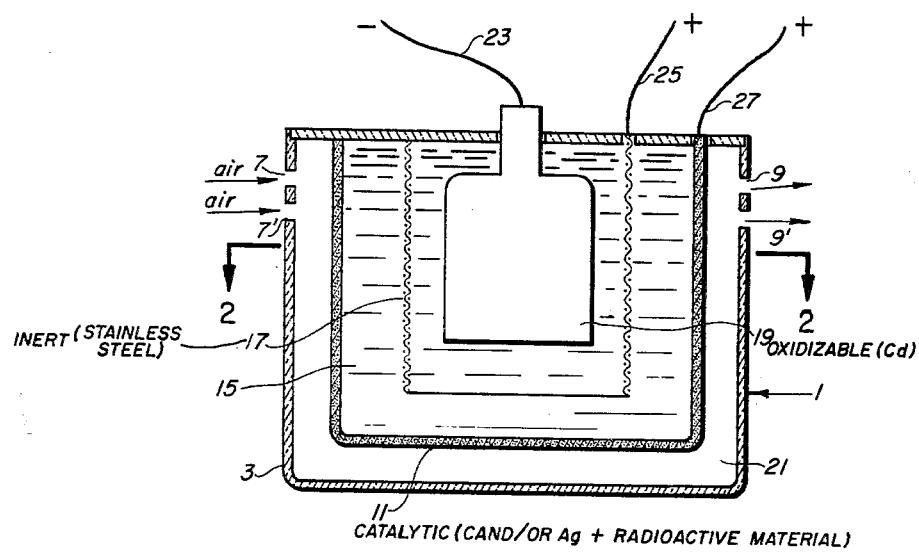
Figure 2:
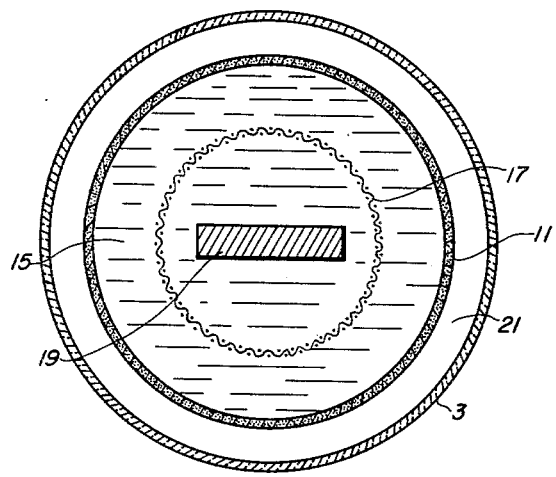

Other features of the invention will be apparent from the following description and the accompanying drawing wherein:

FIG. 1 is an axial sectional view of a rechargeable battery cell embodying the present invention; and FIG. 2 is a cross-sectional view of the battery of FIG. 1 taken along line 2—2 thereof.

In the drawing, a rechargeable battery according to my invention is shown generally at 1 and comprises an outer housing 3 which is provided with a cover 5. The housing 3 and cover 5 are preferably made of electrically nonconductive materials. Typical materials that may be employed for this purpose include the synthetic plastics such as polymethylmethacrylate, copolymeric acrylonitrile-methyl-styrene, copolymeric acrylonitrile-styrene, high-density nylon and high-density polyethylene.

The housing 3 and cover 5 may also be made of electrically conductive material. In this event, the electrodes or their terminals, described more in detail below, are insulated from cover 5 by suitable insulating means such as rubber washers or the like.

Housing 3 is provided with a pair of entrance ports 7 and 7' and a pair of exit ports 9 and 9' for introducing and removing gases from the cell in a manner disclosed in more detail below.

Depending from cover 5 is a cup-shaped gas electrode 11 which is secured to the underside of cover 5 in any suitable manner. Gas electrode 11 forms a closed inner compartment which contains a liquid electrolyte 15, auxiliary electrode 17, and rechargeable electrode 19 described hereinafter. Housing 3 and gas electrode 11 form a channel 21 which serves to convey a depolarizing gas and bring it into contact with gas electrode 11.

In the embodiment of this invention illustrated in the drawing the gas electrode is depolarized by air or oxygen introduced into ports 7 and 7' and removed through ports 9 and 9'. Electrode 11 may be made of any number of materials which are known in the prior art to be suitable for this purpose. Typical materials which may be used include porous carbon, high-density carbon impregnated with a silver catalyst, porous sheet silver or sintered silver. The porosity of these materials is preferably such that gas at one atmosphere applied to the face of the electrode disposed in the electrolyte will not displace electrolyte therefrom. Other materials which are satisfactory for making the oxygen or air electrode are disclosed in U.S. Patents Nos. 2,914,596, 2,017,280 and 2,010,608. In the embodiment illustrated, the electrode material is made of high-density carbon impregnated with a silver catalyst.

Auxiliary electrode 17 may vary in construction and in material from cell to cell. In the battery shown in the drawing, it takes the form of a cylindrical structure made of stainless-steel wire woven into an open mesh and secured to the underside of cover 5 in any suitable fashion. It may also take the form of a flat plate or of a hollow cylinder made of imperforate sheet material.

In general, the material selected for the auxiliary electrode will depend on the character of both the gas electrode and the rechargeable electrode. It will, however, always be substantially inert as noted above.

The rechargeable electrode 19 may be of any suitable and oxidizable active metal. Among the base metals adapted to be used for this purpose there may be mentioned zinc, cadmium, tin and iron. These materials will be in their metallic form or in the form of their oxides or hydroxides, depending on the condition of charge of the rechargeable electrode. In the embodiment of the invention illustrated in the drawing, the rechargeable electrode is a cadmium electrode which in its charged condition is assumed to exist as cadmium.

Rechargeable electrode 19 is also secured to the cover 5 in any suitable material and is provided with a wire lead 23 for connection to an external circuit. Auxiliary electrode 17 and rechargeable electrode 19 are similarly provided with wire leads 25 and 27 respectively for the same purpose.

The electrolyte 15 used in the cell in accordance with the present invention will vary with the electrodes employed. Aqueous alkaline electrolytes are particularly suited for this purpose. In the system shown in the drawing, aqueous solutions of KOH which have a concentration of from about 15% to 50% are contemplated. Aqueous KOH of about 44% is particularly suitable.

In accordance with another aspect of the present invention, to improve the performance of the battery, it is advantageous to incorporate radioactive isotopes in either the gas electrode or the rechargeable electrode. The radiant energy from the radioisotope catalyzes the electrode reactions and improves the performance of the battery. Thus, carbon $C^{14}$ may be incorporated into the air or oxygen electrode 11. The radiation level of the electrode employed can vary considerably. Satisfactory results are obtained with electrodes that have a level ranging from .5 millicurie up to 1 curie and higher per square centimeter of electrode surface. In place of $C^{14}$ other radioisotopes may be incorporated in the electrodes. These include promethium 147, nickel 63, polonium 210, cobalt 60, silicon 32, Sr 90 and Te 99.

In the operation of the embodiment of this invention shown in the drawing, leads 23 and 27 are connected to an external load circuit and air or oxygen is fed into the cell through ports 7 and 7'. The cell then commences to discharge. The overall reaction taking place when cadmium is used as the rechargeable electrode may be described by the following equation:

$$Cd + 4H_2O + O_2 \rightarrow Cd(OH)_2 + 2H_2O$$

When the Cd electrode has been discharged, leads 23 and 27 are disconnected. Leads 23 and 25 are then connected to a charging source in such a fashion that the oxidized active material of rechargeable electrode 19 is reduced. When the recharging operation is complete, leads 25 and 23 are disconnected from the charging source and leads 23 and 27 may then again be connected to the external circuit.

Whereas the invention has been described with reference to a specific form thereof, it will be understood that many changes and modifications may be made without departing from the spirit and scope of the appended claims.

What is claimed is:

1. A rechargeable electric battery comprising a housing; an alkaline electrolyte in said housing; a rechargeable first electrode within said housing in contact with said electrolyte, said first electrode containing as its active material an oxidizable base metal selected from the group which consists of zinc, cadmium, tin and iron; a second electrode in said housing in contact with said electrolyte, said second electrode having a porous body consisting at least in part of an element selected from the group which consists of carbon and silver for promoting the diffusion of oxygen in said electrolyte upon the introduction of an oxygen-containing gaseous fluid into the pores of said body; means terminating at said second electrode for introducing said fluid into said body; a third electrode in said housing in contact with said electrolyte in spaced relationship with said first and second electrodes, said third electrode consisting essentially of a structure composed of a relatively inert metal which is substantially nonoxidizable in said electrolyte; and circuit means for alternately connecting a load between said first and second electrodes and a source of charging current between said first and third electrodes.

2. A rechargeable electric battery comprising a housing; an electrolyte in said housing; a rechargeable inner electrode within said housing in contact with said electrolyte, said inner electrode containing as its active material an oxidizable base metal capable of reversibly reacting with said electrolyte; a first outer electrode in said housing in contact with said electrolyte, said first outer electrode having a porous body consisting essentially of a material more highly electropositive than said base metal and capable of promoting the diffusion of oxygen in said electrolyte upon the introduction of an oxygen-containing gaseous fluid into the pores of said body; means terminating at said first outer electrode for introducing said fluid into said body; a second outer electrode in said housing in contact with said electrolyte in spaced relationship with said inner and first outer electrodes, said second outer electrode consisting essentially of a structure composed of a relatively inert metal which is substantially nonoxidizable in said electrolyte; and circuit means for alternately connecting a load between said inner and first outer electrodes and a source of charging current between said inner and second outer electrodes.

3. A rechargeable electric battery comprising a housing; a liquid electrolyte in said housing; a rechargeable inner electrode within said housing immersed in said electrolyte, said inner electrode containing as its active material an oxidizable base metal capable of reversibly reacting with said electrolyte; an outer electrode in said housing in contact with said electrolyte, said outer electrode having a porous body consisting essentially of a material more highly electropositive than said base metal and capable of promoting the diffusion of oxygen in said electrolyte upon the introduction of an oxygen-containing gaseous fluid into the pores of said body; means terminating at said outer electrode for introducing said fluid into said body; an intermediate electrode in said housing immersed in said electrolyte and spacedly interposed between said inner and outer electrodes, said intermediate electrode consisting essentially of a perforated structure composed of a relatively inert metal which is substantially nonoxidizable in said electrolyte; and circuit means for alternately connecting a load between said inner and outer electrodes and a source of charging current between said inner and intermediate electrodes.

4. A rechargeable electric battery comprising a housing; a liquid electrolyte in said housing; a rechargeable inner electrode within said housing immersed in said electrolyte, said inner electrode containing as its active material an oxidizable base metal capable of reversibly reacting with said electrolyte; an outer electrode in said housing in contact with said electrolyte, said outer electrode having a cup-shaped porous body consisting essentially of a material more highly electropositive than said base metal and capable of promoting the diffusion of oxygen in said electrolyte upon the introduction of an oxygen-containing gaseous fluid into the pores of said body; means including said housing and said body forming a supply channel for introducing said fluid into said body; an intermediate electrode in said housing immersed in said electrolyte and spacedly interposed between said inner and outer electrodes, said intermediate electrode consisting essentially of a perforated cylindrical structure concentric with said body and composed of a relatively inert metal which is substantially nonoxidizable in said electrolyte; and circuit means for alternately connecting a load between said inner and outer electrodes and a source of charging current between said inner and intermediate electrodes.

References Cited by the Examiner

UNITED STATES PATENTS

| 1,182,513 | 5/1916 | Thafehrn | 136—26.05 |
| 1,217,738 | 2/1917 | Flannery | 136—146 |
| 2,097,077 | 10/1937 | Oppenheim | 136—86.2 |
| 2,275,281 | 3/1942 | Berl | 136—86.2 |
| 3,019,358 | 1/1962 | Ohmart | 136—100 |

FOREIGN PATENTS 220,422    8/1924    Great Britain.

WINSTON A. DOUGLAS, Primary Examiner.

JOHN R. SPECK, JOHN H. MACK, Examiners.